Dec. 1, 1964  M. U. WIDMAN  3,159,414
INSERTED NUT PIPE JOINT
Filed Oct. 23, 1961

INVENTOR
MICHAEL U. WIDMAN

BY *Raphael Semmes*

ATTORNEY

3,159,414
INSERTED NUT PIPE JOINT
Michael U. Widman, Columbus, Ohio, assignor, by mesne assignments, to Cast Iron Soil Pipe Institute, Chicago, Ill., a corporation of Illinois
Filed Oct. 23, 1961, Ser. No. 146,735
2 Claims. (Cl. 285—348)

This invention relates to a pipe joint of the type used in connection with soil pipe and the like, and consists more particularly in new and useful improvements in a bell and spigot joint employing a series of nut and bolt assemblies removably insertable in the lead groove of the bell and coacting with a backup ring for compressing the seal. While soil pipe is mentioned as an example, it will be understood that the joint of the present invention may be used with various other types of pipe, including those employed for transporting liquids, solids and gases.

An object of the invention is to provide a low cost soil pipe joint embodying a preferably preformed gasket and a metallic backup ring insertable in a conventional bell and spigot joint having a modified lead groove and wherein the gasket and backup ring are compressed by machine screws inserted in the joint and engaged in said modified lead groove.

Another object of the invention is to provide a pipe joint of this type which not only makes possible a considerable saving in the cost of materials required as compared with the cost of materials for the usual lead-oakum joint seal, but minimizes the assembly time.

A further object of the invention is to provide an inserted nut mechanical compression joint which can readily be assembled by the use of common hand tools, such as a screwdriver or wrench.

Still another object of the invention is to provide a pipe joint of this character wherein the number and relative location of inserted nut and bolt assemblies may be indeterminately varied to meet sealing requirements without requiring structural alterations or pre-located openings or slots in the pipe joint parts.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 1:
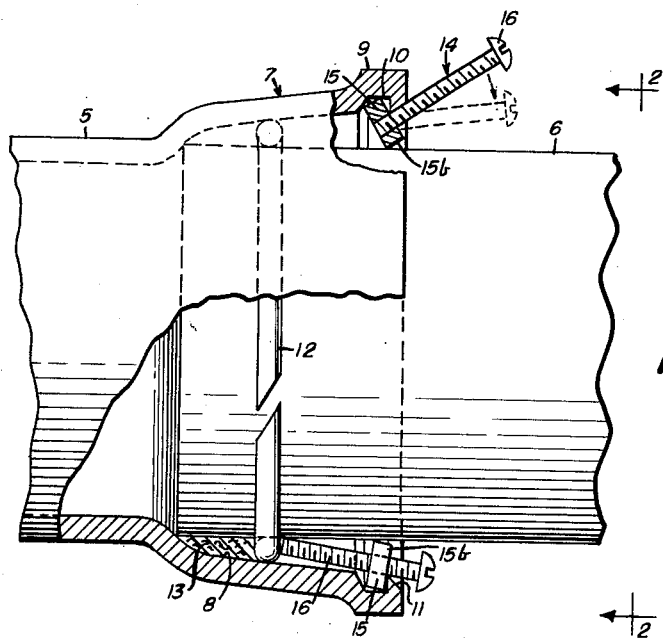
FIGURE 1 is a side elevational view, partly in section, showing the assembly of my improved joint.
Figure 2:
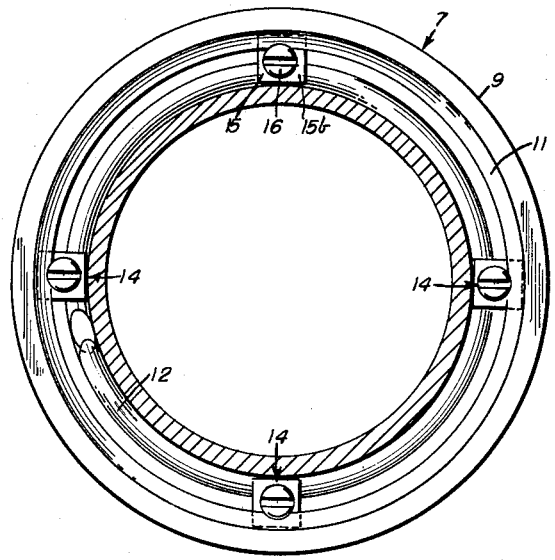
FIGURE 2 is a transverse sectional view taken on line 2—2 of FIGURE 1.

In the drawings, 5 and 6 respectively represent the bell and spigot ends of two sections of soil pipe or the like to be joined. The bell section 5 is provided with a conventional bell or hub 7 which, in this instance, flares outwardly to provide an annular tapered gasket-receiving chamber 8 surrounding the spigot end 6 of an adjacent pipe section. The bell 7 terminates at its open end in an annular flange 9, internally recessed as at 10, to form the usual uninterrupted annular lead groove which, in the present invention, is slightly modified to facilitate the insertion and removal of the nut and bolt assemblies as will later appear. As best seen in FIGURE 1, the flange 9 is provided with an uninterrupted, inwardly directed, annular lip 11 which is radially spaced from the spigot section 6 and beveled at its entering edge to facilitate access to the groove 10 and permit angular manipulation of the nut and bolt assemblies to be described.

A split backup ring 12 of resilient metal is insertable in the chamber 8 of the bell 7 and adapted to compress the seal or gasket 13 in the tapered chamber and against the outer periphery of the spigot end 6 of the inner pipe. As will be seen, the split ring 12 is designed to progressively contract as it is forced inwardly in the bell 7 during compression of the gasket 13.

Figure 3:
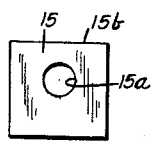
FIGURE 3 is an enlarged plan view of one of the off-center nuts preferably used in the inserted nut and bolt assembly.

The compression of the backup ring and gasket is effected by the insertion and manipulation of a series of annularly spaced nut and bolt assemblies, generally indicated by the numeral 14. Each of these assemblies comprises a nut 15, the threaded opening 15a of which is off-center as best seen in Fig. 3. This off-set arrangement of the nuts 15 provides one short side 15b for each nut, for clearance with the pipe section 6, during manipulation of the assemblies when the respective bolts 16 are being inserted and adjusted. FIG. 1 shows the uppermost nut and bolt assembly 15–16 in the course of insertion. The assembly is first inserted in the position shown in full lines with the threaded end of the nut barely started in the opening 15a of the nut 15. Obviously, the radial depth of the lip 11 determines the radial dimension of the annular clearance between its inner edge and the periphery of the spigot section 6. As will be apparent from the drawings and in order to properly function according to the invention, this annular clearance must have a radial dimension to freely permit the angular and edgewise insertion therethrough of the nuts 15 into the groove 10, with the nuts started on the ends of respective bolts, as shown in full lines at the top of FIG. 1. It will also be apparent from this figure that the radial depth of the lip 11 and its radial spacing from the periphery of the spigot section 6 must be such as to permit the hooking of the nuts under the lip 11 while on the ends of respective bolts, and prevent their withdrawal in the direction of the axes of the bolts on which they are carried, regardless of the angular relation of the bolts 16 with respect to the bell and spigot sections.

After the nuts are inserted in this manner, and the assemblies straightened out by rocking the outer ends of the bolts toward the periphery of spigot 6, as shown in dotted lines at the top of FIG. 1, the nuts are prevented from displacement and withdrawal by their abutment with the inner face of the lip 11, and they are stabilized in this abutting relation and prevented from shifting edgewise through the annular clearance as the bolts are screwed inwardly by the progressive engagement of the projecting ends of the respective bolts 16 with the periphery of the spigot section 6, as seen at the bottom of FIG. 1. In other words, as soon as the ends of the bolts 16 protrude inwardly from the nuts 15, they are in line for progressive engagement with the periphery of the spigot section 6 which prevents disengagement of the nuts from lip 11 and withdrawal through said annular slot. The nut is inserted in the lead groove 10 with its short side 15b adjacent the periphery of the spigot end 6 of the inner pipe section, the bevelled lip 11 at the open end of the flange 9 permitting the angular positioning of the bolt 16 during this insertion.

Then, the angular shifting of the bolt 16 to the position shown in dotted lines brings the nut 15 into engagement with the forward lip 11 which bounds the lead groove 10, so that when the bolt is screwed into the nut, its inner end is aligned for engagement with the backup ring 12 and in peripheral contact with the spigot section 6, as shown at the bottom of FIG. 1.

In the use of the present invention, the bell and spigot ends of pipes 5 and 6 are first assembled as shown, with a suitable gasket or seal 13 and the backup ring 12 in position in the tapered gasket chamber of bell 7. Preferably, a preformed gasket or seal composed of neoprene stock or the like, is used in the chamber 8, although the arrangement is such that other seals such as a standard lead-oakum sealant can be employed. As the bolts 16 are adjusted and advanced through the respective nuts 15, the nut and bolt assemblies are prevented from tipping and withdrawal from the lead groove due to the length of the bolts and their contact with the periphery of spigot section 6, as shown in FIG. 1, and the continued advancement of the bolts around the joint causes the backup ring 12 to firmly compress the gasket 13 in the chamber 8 and around the periphery of the spigot portion 6. The tightening of the bolts 16 may be accomplished by the use of an ordinary screwdriver, although experience has shown that the use of a drill motor and a screwdriver attachment is more effective from the standpoint of conserving time.

If testing of the joint reveals a leak in any particular part of the joint, additional nut and bolt assemblies may be inserted and tightened down on the gasket to stop the leak. It will be apparent that by utilizing the lead groove 10 of the bell 7 for receiving the inserted nuts 15, so that no predetermined positioning of the nut and bolt assemblies is required, the insertion of additional assemblies at points of leakage may be accomplished with a minimum of effort. While for purposes of illustration the drawings show conventional slotted bolts and square nuts, it will be obvious that socket-head cap screws, hex-head screws or Phillip-screws can be employed if desired.

It is generally recognized that mechanical-compression joints possess certain advantages that are not found in other types of joints, as the use of a preformed gasket or sealing element precludes the necessity of using a liquid or hot melt sealant. The elimination of such sealants obviates the necessity of devising special sealant packaging and sealant handling methods, and thus simplifies the assembly and reduces the cost of the joint. It is therefore apparent that the various assembly problems heretofore encountered in mechanical-compression joints have been overcome by the use of the present invention embodying a modified lead groove and the off-center nut and bolt assemblies for compressing the backup ring and gasket.

It may be stated that while a backup ring of circular cross-section has been shown for purposes of illustration, it is possible that a rectangular cross-section may provide more uniform loading of the gasket. Another consideration of the backup ring design is the number of nut and bolt assemblies used to load it. In other words, the number of such assemblies used in the joint has a definite effect on the cross-section of the backup ring. If more nut-bolt assemblies are used, the backup ring will deflect less between bolts, and, therefore, a ring of smaller cross-section can be used. Ordinarily, however, a minimum number of nut-bolt assemblies is used, as their cost is significantly greater than the cost of the backup ring.

There are various considerations to be borne in mind in connection with the design and use of the present invention. The internal taper of the hub or bell determines the depth of the backup ring in the joint and also the holding force which can be applied to the pipe inserted in the hub. Although the pressure of the gasket against the pipe may help resist tensile loads on the joint, the grip of the backup ring against the pipe should constitute the major resistance to tensile loading. The internal taper of the hub may be partially dependent upon the dimensional tolerance on the diameter of the pipe and the hub.

As compared with a conventional lead and oakum joint wherein the lead contributes support over most of the length of the joint when the joint is subject to beam loading, it will be seen from FIG. 1 that the inserted nut compression joint of the present invention receives support from the nut-bolt assemblies and from the backup ring which must be designed to transmit a relatively uniform load to the gasket element, as a non-uniform load could result in leakage. The gasket may also contribute some additional support and, therefore, it is important that the relationship between these points of support be borne in mind to obtain optimum joint beam strength.

Although the specific configuration of the nut groove is relatively unimportant from the standpoint of strength, its design is important from the standpoint of ease of assembly and ease of fabrication of the pipe hub.

While the accompanying drawings illustrate a plain end spigot section and a flaring bell or hub, it is to be understood that the invention is also adaptable to joints wherein the spigot section is provided with an end bead and the bell or hub is provided with straight side walls. Also, the joint may comprise a plain end spigot section and a complementary, straight sided bell section.

In this connection, it may be stated that if the bolts that force the gasket into position are turned sufficiently tight, a seal will be effected on a plain end pipe and the bead is unnecessary. In other words, with this combination the friction of the compressed gasket should be sufficient to hold the joint tightly together. Obviously, when the spigot end is provided with a bead (not shown), the backup ring and the spigot bead will interlock to further facilitate the holding of the joint together.

It may also be stated that while the split ring 12 has been previously described as designed to progressively contract, such description is to be considered in connection with the embodiment employing a tapered bell or hub. With a straight sided bell, it will be apparent that the split ring would not progressively contract.

From the foregoing, it is believed that the invention may be readily understood by those skilled in the art without further description, it being borne in mind that numerous changes may be made in the details disclosed, without departing from the spirit of the invention as set forth in the following claims.

I claim:

1. In a pipe joint for bell and spigot pipe sections including a bell and spigot inserted into the bell, a packing element therebetween and a backup ring for said packing element, means coacting with said backup ring for selectively compressing said packing element at indeterminate points around said joint, said means comprising an internal radial groove in said bell, bounded at the open end of the latter by a continuous, axially directed, annular lip, a plurality of compression assemblies, each comprising a threaded bolt carrying a threadedly engaged nut of a transverse dimension to fit substantially radially between the base of said groove and the periphery of said spigot, the inner annular edge of said lip being radially spaced from the periphery of said spigot a distance to define therewith an uninterrupted annular clearance of a radial width less than said transverse dimension of respective nuts, to thereby prevent displacement of said nuts from said groove in the direction of the axes of the respective bolts engaged thereby, the axial thickness of said lip and said nut being substantially equal, the radial width of said annular clearance being greater than the distance from the inner radial extremities of the respective nuts to the opposite diametric extremities of the bolts engaged thereby, to permit the edgewise insertion of the nuts of said assemblies through said clearance and their angular manipulation into said groove at indeterminate points around the latter, said bolts being of a length to engage the periphery of said spigot at their inner ends as they are progressively advanced through said nuts to stabilize the assemblies and prevent the angular movement of respective nuts out of said groove, said inner ends of respective bolts being engageable with said backup ring to compress the packing element upon the inward screwing of said bolts in respective nuts, and the forward edge of said annular lip being inwardly beveled to accommodate the angular shifting of said bolts in said clearance during the insertion of said compression assemblies.

2. A pipe joint as claimed in claim 1, wherein the threaded openings in respective nuts for receiving said bolts are off-center, whereby one side of each nut forms a lip abutment and the other side of said nut is radially reduced to clear the periphery of said spigot during insertion of assemblies.

References Cited in the file of this patent
UNITED STATES PATENTS

| | | |
|---|---|---|
| 1,474,435 | McWane | Nov. 20, 1923 |
| 1,805,962 | Thomas | May 19, 1931 |
| 1,818,493 | McWane | Aug. 11, 1931 |
| 1,962,401 | McWane | June 12, 1934 |
| 1,980,062 | Janeway | Nov. 6, 1934 |
| 2,145,645 | Byers | Jan. 31, 1939 |